Nov. 20, 1956 W. R. CORRELL 2,771,005
LENS-MEASURING APPARATUS
Filed Oct. 4, 1955 5 Sheets-Sheet 2
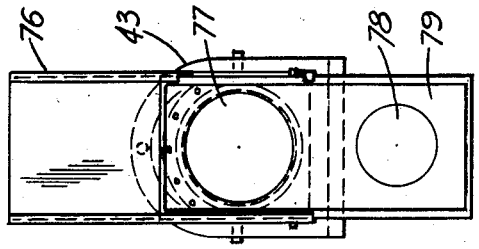
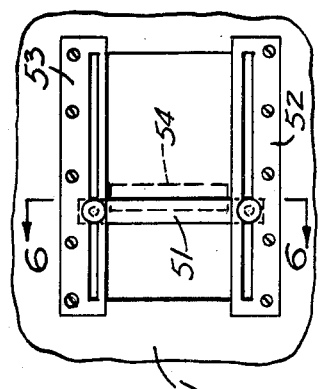
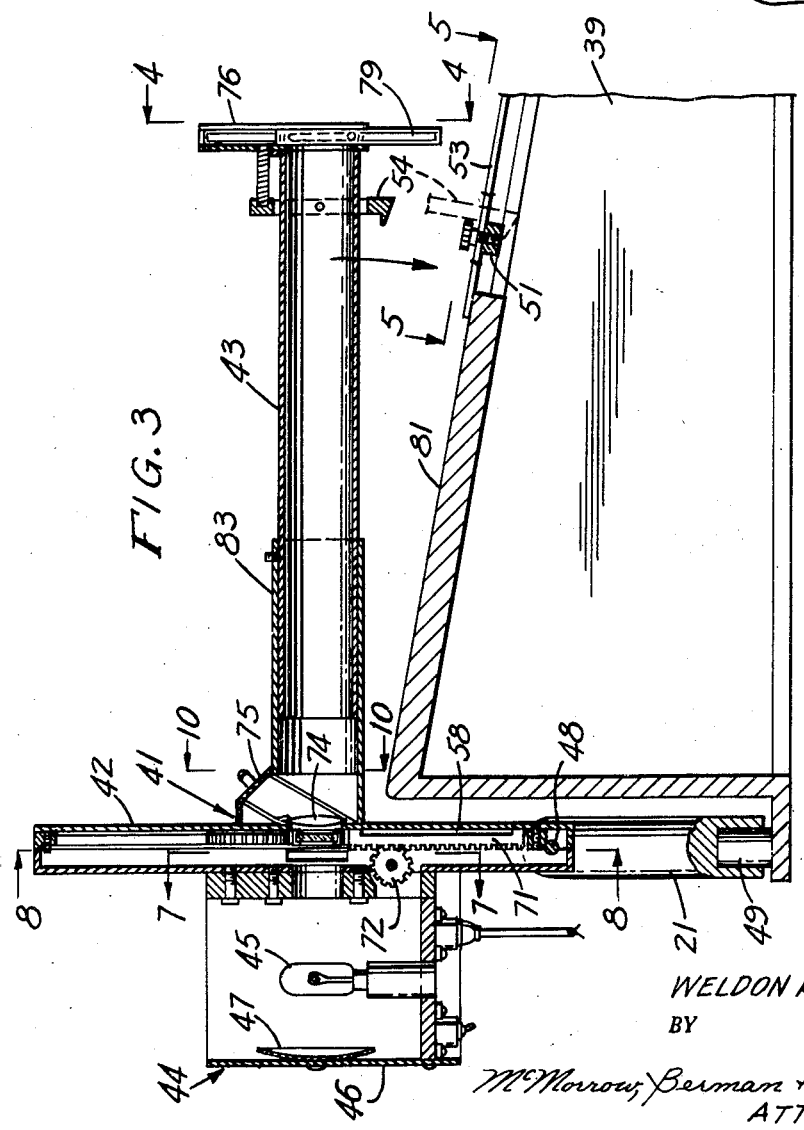
INVENTOR.
WELDON R. CORRELL
BY
McMorrow, Berman + Davidson
ATTORNEYS Nov. 20, 1956
W. R. CORRELL
2,771,005
LENS-MEASURING APPARATUS
Filed Oct. 4, 1955
5 Sheets-Sheet 3
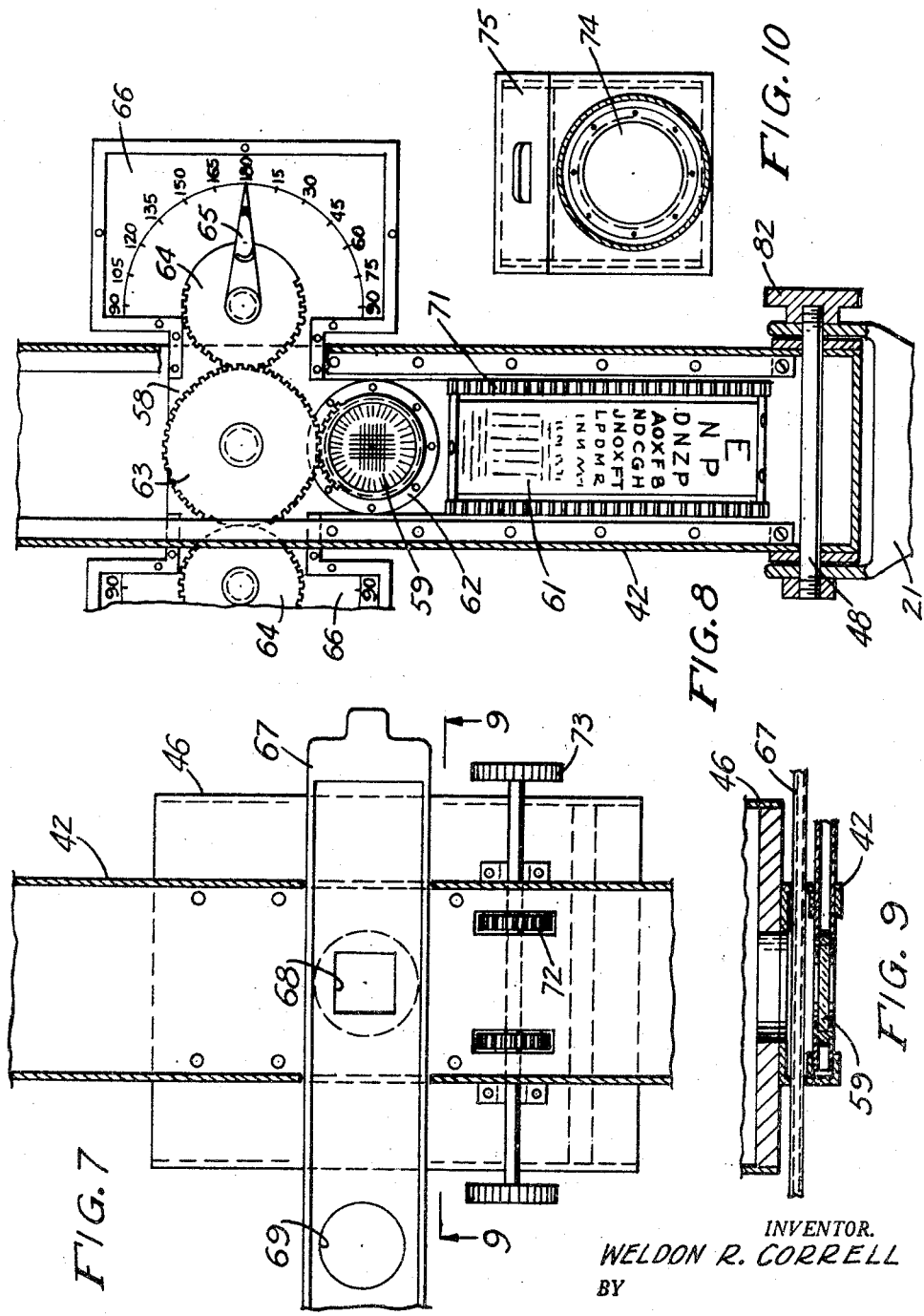
INVENTOR.
WELDON R. CORRELL
BY
McMorrow, Berman & Davidson
ATTORNEYS

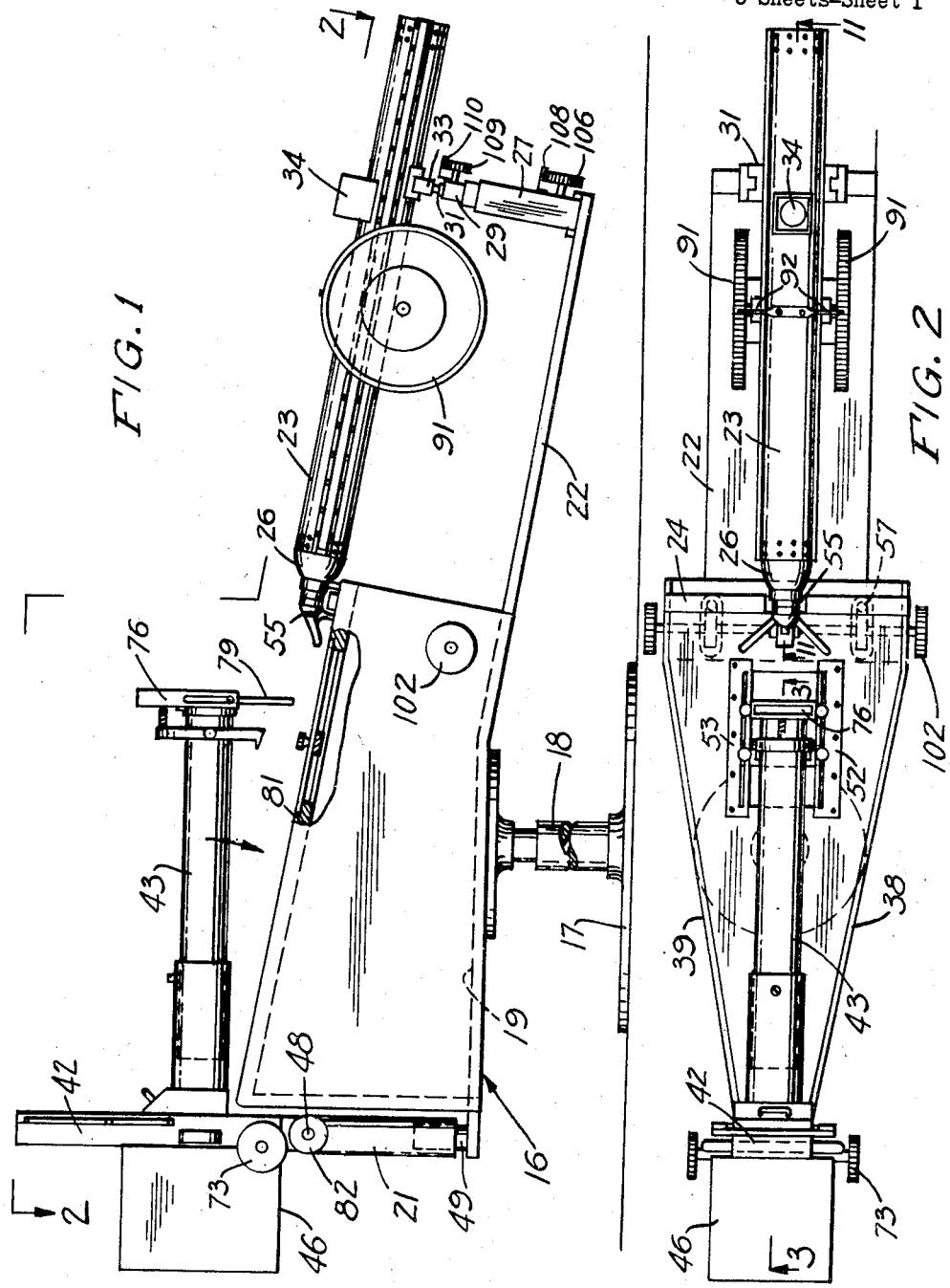

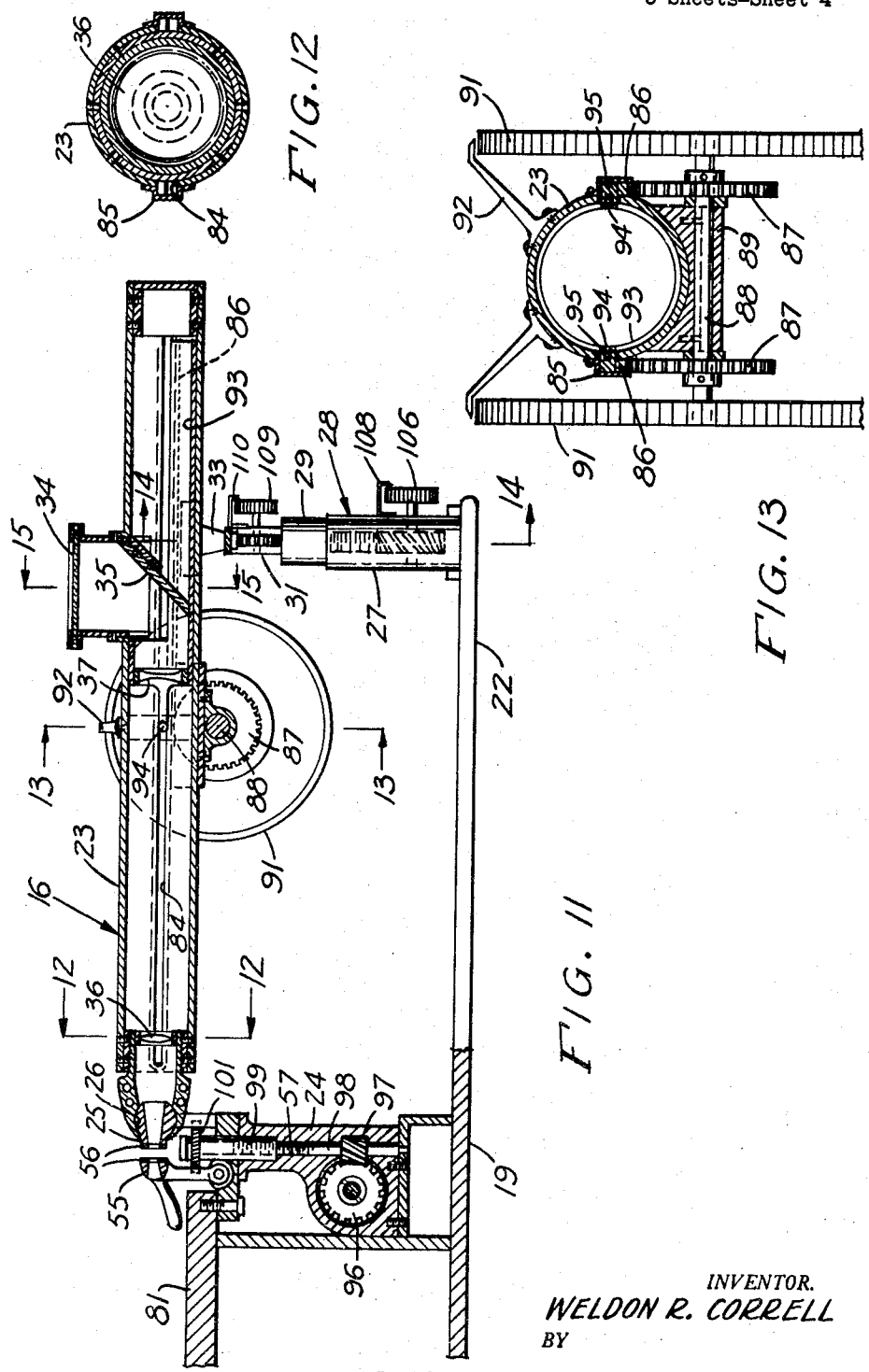

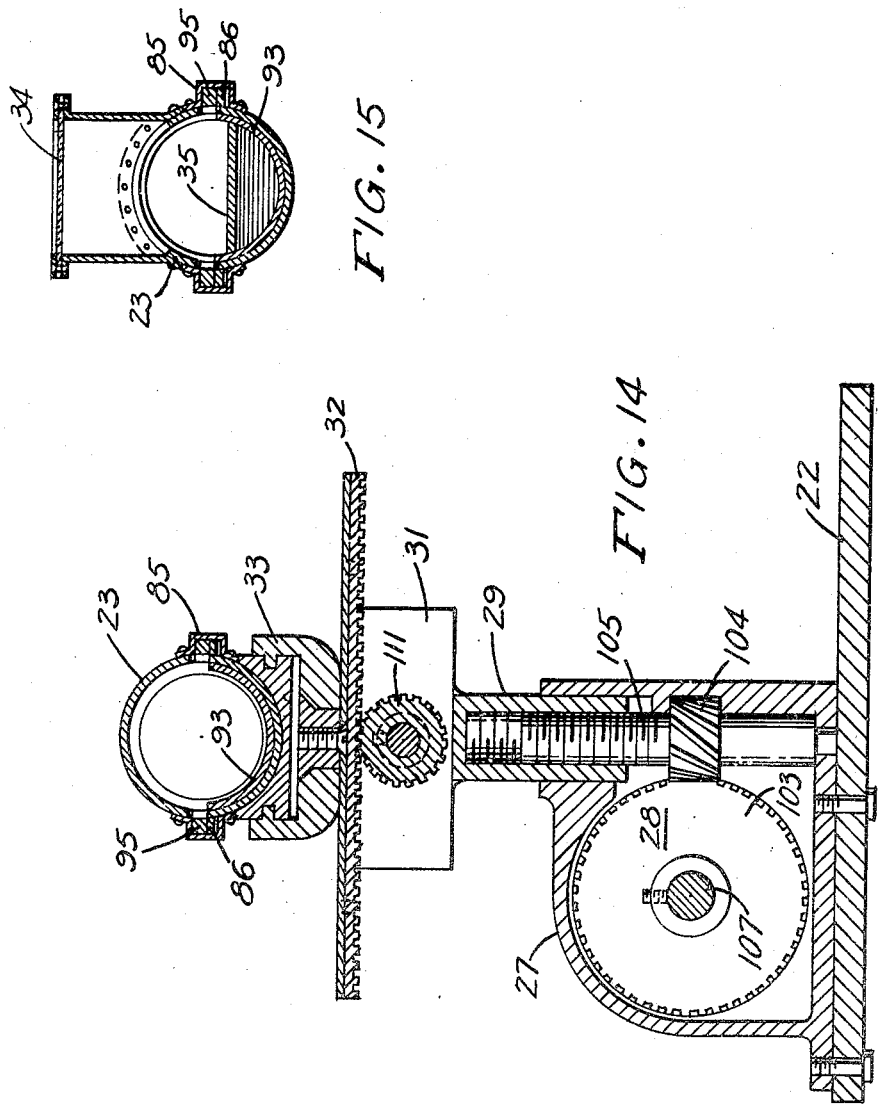

United States Patent Office 2,771,005
Patented Nov. 20, 1956

2,771,005

LENS-MEASURING APPARATUS

Weldon R. Correll, Ellensburg, Wash.

Application October 4, 1955, Serial No. 538,337

3 Claims. (Cl. 88—56)

The present invention relates to an apparatus for measuring the focal length and other characteristics of an ophthalmic lens.

An object of the present invention is to provide a lens-measuring apparatus which enables a refractionist to quickly and accurately measure the focal length, the spherical and cylindrical powers, and the vertical and horizontal prismatic powers of an ophthalmic lens.

Another object of the present invention is to provide an apparatus for measuring the focal length and other characteristics of an ophthalmic lens which enables a refractionist to visually demonstrate the optical defects in an ophthalmic lens.

A further object of the present invention is to provide an apparatus for measuring the focal length and other characteristics of an ophthalmic lens which is compact and simple in structure requiring a minimum of space and so constructed as to be easily movable into a position of use, and one which is commercially practical.

These and other objects and advantages of the present invention will be fully apparent from the following description when taken in connection with the annexed drawings, in which:

Figure 1 is an elevational view of the apparatus of the present invention,

Figure 2 is a view of the assembly of Figure 1 as taken on the line 2—2 of Figure 1, Figure 3 is a fragmentary view, on an enlarged scale, taken on the line 3—3 of Figure 2, Figure 4 is a fragmentary view, on an enlarged scale, taken on the line 4—4 of Figure 3, Figure 5 is a fragmentary view, on an enlarged scale, taken on the line 5—5 of Figure 3, Figure 6 is a fragmentary view, on an enlarged scale, taken on the line 6—6 of Figure 5, Figure 7 is a fragmentary view, on an enlarged scale, taken on the line 7—7 of Figure 3, Figure 8 is a fragmentary view, on an enlarged scale, taken on the line 8—8 of Figure 3, Figure 9 is a fragmentary view taken on the line 9—9 of Figure 7, Figure 10 is a fragmentary view, on an enlarged scale, taken on the line 10—10 of Figure 3, Figure 11 is a fragmentary view, on an enlarged scale, taken on the line 11—11 of Figure 2, Figure 12 is a fragmentary view, on an enlarged scale, taken on the line 12—12 of Figure 11, Figure 13 is a fragmentary view, on an enlarged scale, taken on the line 13—13 of Figure 11, Figure 14 is a fragmentary view, on an enlarged scale, taken on the line 14—14 of Figure 11, and Figure 15 is a fragmentary view, on an enlarged scale, taken on the line 15—15 of Figure 11.

Referring in greater detail to the drawings in which like numerals indicate like parts throughout the several views, the lens-measuring apparatus of the present invention is designated generally by the reference numeral 16 and comprises a base 17, a standard 18 rising from the base 17, a horizontally-disposed platform 19 supported intermediate its ends upon the standard 18 for rotational movement about the standard 18 as an axis, and a pedestal rising from the platform 19 adjacent one end thereof, the pedestal being indicated by the reference numeral 21. The platform 19 has a portion 22 between the standard 18 and the end of the platform 19 which is remote from the pedestal 21 sloping in a direction upwardly from the end of the platform which is remote from the pedestal 21. A focusing tube 23 is positioned above the platform sloping portion 22 and extends parallel to the portion 22.

Means carried by the platform 19 supports the end of the tube 23 which is adjacent the standard 18 for rocking movement about a horizontal axis parallel to the sloping platform portion 22. Specifically, such means, shown most clearly in Figure 11, embodies a support member 24 on the platform 19 intermediate the ends of the platform and having a ball formation 25 on its upper end received in a ball socket formation 26 on the one end of the tube 23.

Means carried by the platform 19 supports the tube 23 intermediate the ends of the tube 23 for a limited swinging back and forth horizontal movement and up and down vertical movement about the horizontal axis which is parallel to the platform sloping portion 22. Specifically, such means, as shown in Figures 11 and 14, embodies an upstanding housing 27 containing a spur gear and a worm gear assembly 28 operatively connected to a vertically arranged elevating post 29 on the upper end of which is mounted a horizontal slide block 31 supporting for sliding movement thereon the rack gear 32 which supports a saddle member 33, the latter carrying the tube 23.

A viewing and measuring screen 34 is spaced above and connected in communication with the interior of the tube 23 intermediate the ends of the tube and extends parallel to the tube. A projecting mirror 35 is positioned within the tube below the screen 34 and cooperates with the screen 34 to reflect a beam of light which is transmitted through the tube 23 by means of a lens system which is mounted in the tube 23 between the one end of the tube which has the ball socket formation 26 and the mirror 35. The lens system includes a fixed lens 36 and a movable lens 37, a mounting for the movable lens 37 being shown in Figures 11 and 13 and will be hereinafter described in detail.

A pair of upstanding side walls 38 and 39 rise from the platform 19 inwardly of the pedestal 21, the upper edges of the side walls 38 and 39 sloping in a direction upwardly complemental to the sloping direction of the platform sloping portion 22, the upper edges of the side walls 38 and 39 being positioned below and spaced from the tube 23.

A light-projecting assembly designated by the reference numeral 41 and including an upstanding casing 42, a horizontally-disposed tunnel member 43 which is positioned so as to project from the front face of the casing 42 and has one end connected in communication with the front face of the casing 42, and a light-projecting source designated by the reference numeral 44 is positioned so that the tunnel member 43 extends horizontally over and spaced above the sloping upper edges of the side walls 38 and 39. The light-projecting source 44 includes an electric light bulb 45 mounted in a housing 46 with a mirror 47 concentrating the light of the light bulb into an aperture formed in the one wall of the housing 46.

The lower end of the casing 42 of the light-projecting assembly 41 is mounted upon the upper end of the pedestal 21 for swinging movement about a horizontal axis, a pivot pin 48 extending through the lower end of the casing 42 and the upper end of the pedestal 21 permits the movement of the light-projecting assembly 41 from the position in which the tunnel member 43 is horizontally above and spaced from the upper edge of the side walls 38 and 39 to a position in which the tunnel member is in the space above the upper edges of the side walls 38 and 39 with its other end remote from the casing 42 in alignment with the one end of the tube 23 which has the ball socket formation 26 thereon. The lower end of the pedestal 21 is mounted upon a post 49 for swinging movement of the tunnel member 43 about the post 49 as an axis.

Cooperating means is carried by the side walls 38 and 39 and the tunnel member 43 for holding the tunnel member in its position of alignment with the tube 23. Specifically, such means embodies an adjustable catch element 51 mounted between slide plates 52 and 53 (Figures 2 and 3) and engageable with the hooked end of a latch element 54 which is pivotally carried by the tunnel member 43 at a point spaced inwardly from the end of the tunnel member 43 which is adjacent the tube 23, the latch element 54 being shown in full lines in unengaged position in Figure 3 and in dotted lines in that figure in its engaged position for holding the tunnel member 43 in its position aligned with the tube 23.

Means is provided for supporting a lens to be measured adjacent to the horizontal axis of the tube 23 inwardly of and adjacent that axis, and adjacent the one end of the tube 23 having the ball socket formation 26. This means includes a clamping arm 55 mounted upon the upper end of the support member 24 and movable into an abutting engagement with the exterior end of the ball formation 25, there being resilient clamping members 56 on each of the abutting faces of the arm 55 and the ball formation 25. An aperture extends through the arm 55 in axial alignment with an aperture within the ball formation 25. A lens to be measured is mounted within the space between the members 56 and is clamped thereby and an elevating mechanism designated by the reference numeral 57 supports the lens either singly or when the lens is in a spectacle frame, the elevating mechanism 57 permitting the adjustment of the spectacle frame to a horizontal position prior to the testing of the lens, the latter not being shown.

Referring to Figures 3 and 7 to 10, inclusive, the casing 42 is seen to contain a vertically-arranged slide 58 carrying a lens 59 having an opaque astigmatic chart thereon, the slide 58 also carrying a transparent panel 61 having ophthalmic test letters thereon, here shown in an inverted state the purpose of which will be hereinafter described. The chart lens 59 is mounted in a frame 62 for rotation about a horizontal axis and is drivably connected to a gear 63 mounted upon the slide 58. A pair of indicator gears 64 are arranged one on each side of the slide 58 and are carried thereby and have pointers 65 movable over the respective dials 66 for indicating the angular rotational movement of the lens 59 when the latter has been moved.

Another slide 67 is mounted within the casing 42 for horizontal back and forth movement and is provided with a square aperture 68 (Figure 7) in registry with the aperture in the housing 46 and with another aperture 69 here shown as circular in form which may be moved into registry with the aperture in the housing 46. A rack 71 carried by the slide 58 is in mesh with a pair of gears 72 rotatably supported in the casing 42 and manually operable by means of the knobs 73 which are exterior of the casing 42 to raise and lower the slide 58 to bring either the lens 59 or the panel 61 into registry with the aperture in the slides 67 and the axis of the tunnel member 43.

A condensing lens 74 is mounted in a box frame 75 for removal for cleaning, the box frame 75 being slidable into an opening in the one end of the tunnel member 43 adjacent the casing 42. The box frame 75 with its lens 74 is shown in detail in Figure 10.

The other end of the tunnel member 43 carries a vertically disposed slide frame 76, shown in detail in Figure 4, and carrying a pair of lenses 77 and 78 mounted in a slide 79 for upward and downward movement.

The tunnel member 43 is shown in Figures 1 and 3 in its horizontal position in which the lens 77 is in registry with the axis of the tunnel member and in this position is used for projecting the test chart which is on the panel 61 upon a vertical wall surface (not shown). Upon downward movement of the tunnel member 43 to the position in which the latch element 54 will engage the catch 51, the lens 77 will be brought out of line with respect to the axis of the tunnel member by the upward movement of the slide 79 when the lower end of the slide 79 engages the top 81 which extends across the upper edges and joins the upper edges of the side walls 38 and 39 together.

The tunnel member 43 may be swung to any position above and below the horizontal and may be locked in a position above or below the horizontal by means of a tightening thumb nut 82 threadedly engaged with the pivot pin 48, as shown in Figure 8. The image of the test letters upon the panel 61 may be focused upon the vertical wall surface by means of the telescopic joint 83 in the tunnel member 43.

Means is provided operatively connecting the movable lens 37 in the lens system for effecting the movements of the movable lens 37 relative to the mirror 35. Specifically, such means includes a slot 84 extending longitudinally along each of the sides of the tube 23, each slot 84 being covered for most of its length by a channel-shaped member 85, the latter being open on its lower end for a portion of its length as shown in detail in Figure 13. A rack 86 is positioned within each of the channel-shaped members 85 with its teeth projecting downwardly and engageable by the adjacent one of the spur gears 87. A shaft 88 journaled in a block 89 supported upon the lower side of the tube 23 carries the spur gears 87 for rotation therewith and has its ends provided with a wheel 91. A pair of pointers 92 extend from the upper side of the tube 23 over the periphery of the wheels 91. A slide member 93 within the tube 23 has one end cylindrical in form and supports the lens 37 and has its other end semi-cylindrical in form so that the mirror 35 may project down into the interior of the slide member 93. The racks 86 within each of the channel-shaped members 85 are connected by a pin 94 to the forward end of a pair of guide arms 95 which are also slidably mounted within the channel-shaped members 85 and are fixedly secured on each side of the slide member 93. Upon turning movement of either of the wheels 91 the slide member 93 will move toward and away from the mirror 35 within the tube 23.

Cooperating measuring means is provided for measuring the distance of movement of the tube 93 as an indication of the focal length of the lens to be measured when the latter is mounted between the resilient clamping members 56. Specifically, the measuring means embodies calibrations upon the periphery of each of the wheels 91 and the ends of the pointers 92 which extend over the periphery of each of the wheels 91. The calibrations on the wheels are preferably in units which express the focal length of the lens to be measured.

The elevating mechanism 57 includes a spur gear 96 in mesh with a worm gear 97 on a shaft 98, the upper end of the shaft being threadedly connected to a lens-supporting member 99 having an adjusting screw 101 thereon for leveling the spectacle containing the lens to be tested. A hand wheel 102 on one side of the platform 19 provides a means for manually raising and lowering the member 99 to position a portion of the lens to be tested within the aperture of the resilient clamping members 56.

Means is operatively connected to the tube 23 for effecting its back and forth movement in a horizontal plane and the up and down movements of the tube in a vertical plane. Specifically, such means includes the gear assembly 28 which includes, as shown in Figure 14, a spur gear 103 in mesh with a worm gear 104 on the shaft 105, the upper end of the shaft 105 being threadedly engaged in the lower end of the post 29. A hand wheel 106 is connected by a shaft 107 to the spur gear 103 and an indicator arm 108 projects over the periphery of the hand wheel 106. Rotational movement of the hand wheel 106 results in raising and lowering the post 29.

Cooperating measuring means is provided for measuring the up and down movements of the tube 23 as an indication of the vertical prismatic characteristics of the lens to be measured. Specifically, such means includes calibrations on the periphery of the wheel 106 and the indicator arm 108. Preferably, the calibrations upon the periphery of the hand wheel 106 are such that they indicate the prismatic powers of the lens to be measured.

Means is provided for effecting the back and forth movement of the tube 23. Specifically, such means includes another hand wheel 109 having an indicating arm 110 extending over the periphery thereof, the hand wheel 109 being connected by a gear 111 to the rack gear 32, the latter supporting the saddle member 33 for horizontal back and forth movement upon rotation of the hand wheel 109.

Cooperating measuring means is provided for measuring the back and forth movement of the tube 23 as an indication of the horizontal prismatic characteristic of the lens to be measured. Specifically, such means comprises calibrations upon the periphery of the wheel 109 and the indicator arm 110, the calibrations on the periphery of the wheel 109 being in units such that will indicate the prismatic characteristics of the lens to be measured.

The means for rotating the lens 59 which carries the astigmatic chart and the means for measuring the distance of rotation of the lens 59 includes the gear 63 mounted upon the frame 62 and the indicator gears 64, together with their pointers 65 over the dials 66.

In use, the refractionist places a lens between the clamping member 56 with a portion of the lens to be measured in registry with the apertures therethrough. The tunnel member 43 is brought from its horizontal position to its position of end alignment with the tube 23 which movement shifts the lens 77 out of the path of the light beam and shifts the lens 78 into the light beam path. A chart lens 59 is then moved into the path of the light beam and one of the wheels 91 is turned to move the lens 37, the latter being a neutralizing lens, to focus the image of the chart upon the screen 34. Alignment of the image of the chart upon the screen is effected by rotating the lens 59 by means of the indicator gears 64, the distance of rotary movement of the image of the chart upon the screen being measured thereon as an indication of the astigmatic characteristics of the lens to be measured.

When the lens to be measured has had all of its characteristics noted, the refractionist may shift the tunnel member 43 to its horizontal position or beyond its horizontal position and may also shift it about the post 49 as an axis, and with the panel 61 in the path of the light beam and the lens 77 shifted also into the path of the light beam, the image of the test letters upon the panel 61 may be projected upon the walls of the refractionist's office or other vertical surface for objective examination of the patient's visual acuity.

What is claimed is:

1. A lens-measuring apparatus comprising a base, a standard rising from said base, a horizontally-disposed platform supported intermediate its ends on said standard for rotational movement about said standard as an axis, a pedestal rising from said platform adjacent one end thereof, said platform having the portion between said standard and the other end thereof sloping in a direction upwardly from the other end, a focusing tube positioned above said platform sloping portion and extending parallel to said portion, means carried by said platform and supporting the end of said tube adjacent said standard for rocking movement about a horizontal axis parallel to said platform sloping portion, means carried by said platform and supporting said tube intermediate its ends for limited swinging back and forth horizontal movement and up and down vertical movement about said horizontal axis, a viewing and measuring screen spaced above and connected in communication with the interior of said tube intermediate its ends and extending parallel to said tube, a projecting mirror fixedly mounted in said tube for cooperation with said screen, a lens system mounted in said tube between said one end and said mirror, said system including a lens mounted in said tube for movement toward and away from said mirror, a pair of upstanding side walls rising from said platform inwardly of said pedestal, the upper edges of said walls sloping in a direction upwardly complemental to the sloping direction of said platform portion and being spaced below said tube, a light-projecting assembly including an upstanding casing, a horizontally-disposed tunnel member positioned so as to project from the front face of said casing and having one end connected in communication with said front face, and a light-projecting source connected in communication with the back face of said casing positioned so that the tunnel member extends horizontally over and spaced above the sloping upper edges of said walls, said assembly being connected to said pedestal for movement of the assembly from the position in which the tunnel member is horizontally above and spaced from the upper edges of said side walls to a position in which the tunnel member is in the space above the upper edges of said side walls with its other end in alignment with said one end of said tube, cooperating means carried by said side walls and said tunnel member for releasably holding the tunnel member in its end aligned position, support means inwardly of and adjacent said axis and carried by said platform for receiving a lens to be measured, and a lens carrying an astigmatic chart positioned in said casing and movable into position bridging said tunnel member adjacent said one end of the latter.

2. A lens-measuring apparatus comprising a base, a standard rising from said base, a horizontally-disposed platform supported intermediate its ends on said standard for rotational movement about said standard as an axis, a pedestal rising from said platform adjacent one end thereof, said platform having the portion between said standard and the other end thereof sloping in a direction upwardly from the other end, a focusing tube positioned above said platform sloping portion and extending parallel to said portion, means carried by said platform and supporting the end of said tube adjacent said standard for rocking movement about a horizontal axis parallel to said platform sloping portion, means carried by said platform and supporting said tube intermediate its ends for limited swinging back and forth horizontal movement and up and down vertical movement about said horizontal axis, a viewing and measuring screen spaced above and connected in communication with the interior of said tube intermediate its ends and extending parallel to said tube, a projecting mirror fixedly mounted in said tube for cooperation with said screen, a lens system mounted in said tube between said one end and said mirror, said system including a lens mounted in said tube for movement toward and away from said mirror, a pair of upstanding side walls rising from said platform inwardly of said pedestal, the upper edges of said walls sloping in a direction upwardly complemental to the sloping direction of said platform portion and being spaced below said tube, a light-projecting assembly including an upstanding casing, a horizontally-disposed tunnel member positioned so as to project from the front face of said casing and having one end connected in communication with said front face, and a light-projecting source connected in communication with the back face of said casing positioned so that the tunnel member extends horizontally over and spaced above the sloping upper edges of said walls, said assembly being connected to said pedestal for movement of the assembly from the position in which the tunnel member is horizontally above and spaced from the upper edges of said side walls to a position in which the tunnel member is in the space above the upper edges of said side walls with its other end in alignment with said one end of said tube, cooperating means carried by said side walls and said tunnel member for releasably holding the tunnel member in its end aligned position, support means inwardly of and adjacent said axis and carried by said platform for receiving a lens to be measured, a lens carrying an astigmatic chart positioned in said casing and movable into position bridging said tunnel member adjacent said one end of the latter, means including a hand-operable wheel operatively conected to said movable lens in said lens system for effecting the movements of said movable lens relative to said mirror, cooperating measuring means on said wheel and on said tube for measuring the distance of movement of said tube as an indication of the focal length of said lens to be measured, means including other hand-operable wheels operatively connected to said tube for effecting the movements of said tube, and separate cooperating means on said other wheels and on said platform sloping portion for measuring the back and forth movement of said tube as an indication of the horizontal prismatic characteristics of said lens to be measured and for measuring the up and down movements of said tube as an indication of the vertical prismatic characteristics of the lens to be measured.

3. A lens-measuring apparatus comprising a base, a standard rising from said base, a horizontally-disposed platform supported intermediate its ends on said standard for rotational movement about said standard as an axis, a pedestal rising from said platform adjacent one end thereof, said platform having the portion between said standard and the other end thereof sloping in a direction upwardly from the other end, a focusing tube positioned above said platform sloping portion and extending parallel to said portion, means carried by said platform and supporting the end of said tube adjacent said standard for rocking movement about a horizontal axis parallel to said platform sloping portion, means carried by said platform and supporting said tube intermediate its ends for limited swinging back and forth horizontal movement and for up and down vertical movement about said horizontal axis, a viewing and measuring screen spaced above and connected in communication with the interior of said tube intermediate its ends and extending parallel to said tube, a projecting mirror fixedly mounted in said tube for cooperation with said screen, a lens system mounted in said tube between said one end and said mirror, said system including a lens mounted in said tube for movement toward and away from said mirror, a pair of upstanding side walls rising from said platform inwardly of said pedestal, the upper edges of said walls sloping in a direction upwardly complemental to the sloping direction of said platform portion and being spaced below said tube, a light-projecting assembly including an upstanding casing, a horizontally-disposed tunnel member positioned so as to project from the front face of said casing and having one end connected in communication with said front face, and a light-projecting source connected in communication with the back face of said casing positioned so that the tunnel member extends horizontally over and spaced above the sloping upper edges of said walls, said assembly being connected to said pedestal for movement of the assembly from the position in which the tunnel member is horizontally above and spaced from the upper edges of said side walls to a position in which the tunnel member is in the space above the upper edges of said side walls with its other end in alignment with said one end of said tube, cooperating means carried by said side walls and said tunnel member for releasably holding the tunnel member in its end aligned position, support means inwardly of and adjacent said axis and carried by said platform for receiving a lens to be measured, a lens carrying an astigmatic chart rotatably supported in said casing and movable into position bridging said tunnel member adjacent said one end of the latter, means for rotating said chart lens when the latter is in its bridging position in said tunnel member, and means on said screen for measuring the distance of rotation of said chart lens as an indication of the astigmatic characteristics of the lens to be measured.

No references cited.